Oct. 13, 1970   H. DAHMS   3,533,272

PREPARATION OF GAS MIXTURES

Filed June 3, 1968

United States Patent Office 3,533,272
Patented Oct. 13, 1970

3,533,272
PREPARATION OF GAS MIXTURES
Harald Dahms, 22 Lakeview Road,
Ossining, N.Y. 10562
Filed June 3, 1968, Ser. No. 733,921
Int. Cl. G01d 21/00
U.S. Cl. 73—1                                    12 Claims

ABSTRACT OF THE DISCLOSURE

Apparatus for preparing gas mixtures for testing gas and analyzers. A gas mixture is enclosed in a container and allowed to seep out through a membrane at a very slow rate. Through this expedient an extremely dilute gas mixture can be produced. The concentration of the particular gas is controlled by proper selection of the membrane material, concentration of gas within, area of the membrane etc.

---

Gas mixtures containing accurately known low concentrations of one or more components are of importance for a variety of technical applications. One area of importance is the field fo air pollution studies where pollutants which are often present in concentrations below one part of pollutant per one million parts of air have to be investigated. The analytical instruments used in these studies have to be standardized against gas mixtures of known concentration. Another area in which such gas mixtures are important is the field of semiconductor preparation where semiconductor surfaces are prepared by reactions with gas mixtures containing low concentrations of reactive gases or vapors.

The preparation of gas mixtures containing one component in a concentration of only one part per million or even one part per billion meets with considerable experimental difficulties. Conventional volumetric or gravimetric mixing techniques are often inaccurate due to the extremely small amount of substance involved and can lead to erroneous results caused by adsorption and reaction of the substance on container walls.

It is well known that membranes made of plastic materials such as polytetrafluorethylene or silicone rubber have a certain permeability for gases. The permeability of such plastic membranes for gases such as carbon monoxide, sulfur dioxide, nitrogen dioxide and others has been, for example, used in gas sensing apparatus as described in my copending application Ser. No. 718,032 filed April 2, 1968.

Based on the permeability of gases through plastic membranes, a source for the addition of a contaminant to a gas stream may simply consist of a vessel containing the contaminant, with a permeable membrane being part of the walls of the vessel. It is, however, obvious that such devices have only limited lifetimes due to the continuous loss of contaminant. This problem is especially severe with gases such as carbon monoxide or nitrogen oxide. Since these gases have their critical temperatures far below room temperature, they cannot be liquefied at any pressure at room temperature. (Gases of this type will be called "permanent gases" in this application.) Another problem caused by the continuous gas permeation is the fact that there is an accumulation of diffusing contaminant close to the membrane surface when the principal gas stream is not flowing. After starting the gas flow there is a considerable period of time during which the concentration of the gas mixtures changes.

The present invention provides generally applicable, simple devices for adding contaminants to a gas stream. The supply of contaminant is not easily exhausted. When not in use the devices can be stored without gradually losing their usefulness. The apparatus described provides also gas which contains a certain constant concentration of contaminants without requiring any waiting time during which the contaminant concentration changes.

In the drawings which illustrate certain forms of the invention

Figure 1:
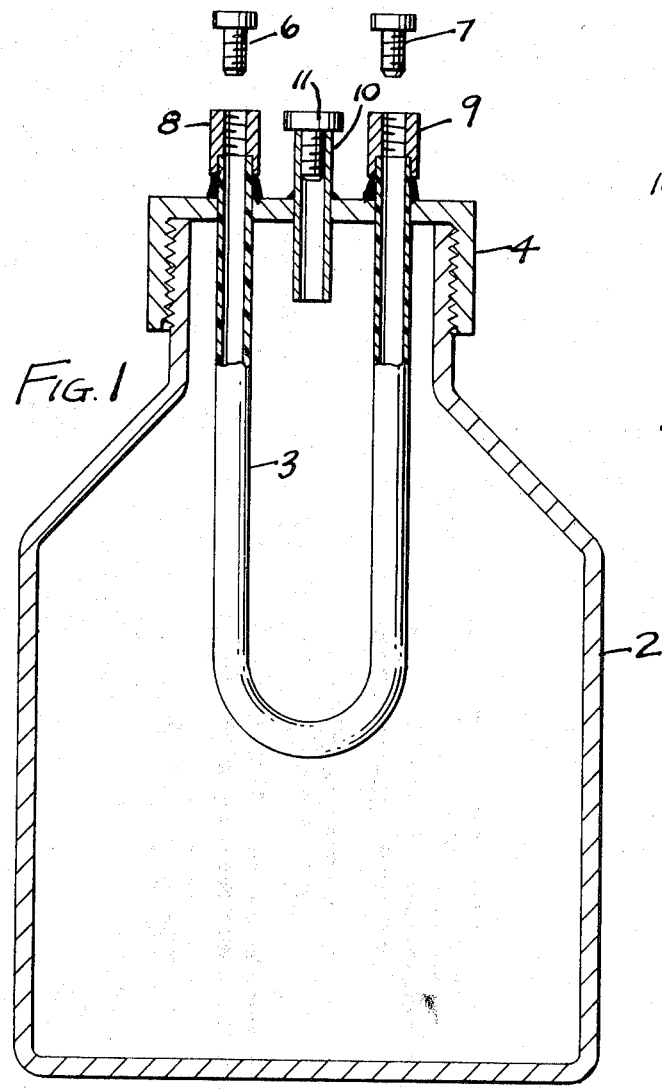
FIG. 1 is a view in cross section, partly in elevation, of a prefered embodiment of a device for adding controlled amounts of contaminants to a gas stream.

In FIG. 1 the gaseous contaminant which is to be added to the gas stream is located inside container 2 the walls of which are impermeable to said contaminant (e.g. walls of glass, metal or impermeable plastic of suitable thickness.) Tubing 3 is hermetically sealed into a similarly impermeable cap 4 so that tubing and cap constitute a unit. Tubing 3 constitutes a membrane, being made of material which is permeable to the contaminant so that a controlled amount of contaminant diffuses to the inside of tubing 3. When the device is in use, a stream of gas can be passed through tubing 3, entering inlet 8, so that the gas leaving outlet 9 contains a certain concentration of contaminant. When the device is not in use, it can be stored with impermeable screw plugs 6 and 7 sealing threaded inlet 8 and outlet 9, respectively. Threaded inlet 10 which can be sealed by impermeable screw plug 11 is used for filling container 2 with the contaminant gas. The walls of the inlets 8 and 10 and outlet 9 are of impermeable material.

Figure 2:
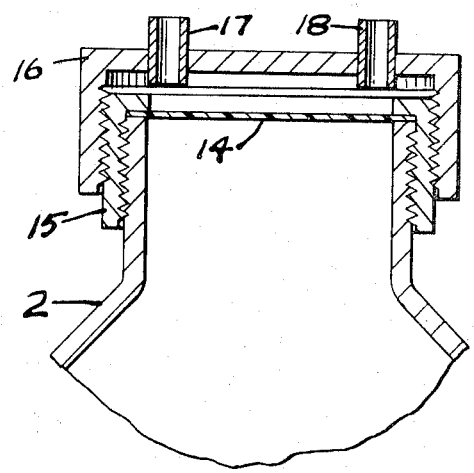
FIG. 2 is a partial view of another form of a device for adding contaminants using a planar permeable membrane.
Figure 3:
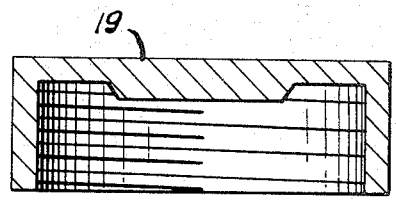
FIG. 3 shows a cap for use with the form shown in FIG. 2.

In the embodiment shown in FIG. 2 the material which is permeable to the contaminant is used in the form of a plane membrane 14 which is clamped between the threaded mouth of container 2 and adapter 15 which can be screwed on and then sealed so that the adapter and container form a unit. Impermeable cap 16 which is equipped with gas inlet 17 and gas outlet 18 fits onto adapter 15. When the device is not in use cap 16 is replaced by cap 19 (FIG. 3) which seals the container mouth so that the out-diffusion of the contaminant is stopped after equal partial pressure is established on both sides of the membrane.

A wide variety of plastic materials can be used as permeable tube or mebrane such as, for example, polytetrafluoroethylene, fluorinated ethylene-propylene copolymer (Teflon FEP), polyethylene, or silicone rubber. The rate of permeation can be easily adjusted to the desired range by simply varying the thickness and surface area of the plastic material since the rate of permeation increases with surface area and decreases with thickness. It is, however, preferred to keep the thickness of the membrane below 5 mm. since thickness membranes need a long time, often on the order of hours, before a constant permeation rate is attained. The plastic preferably has a low solubility for the contaminant since considerable solubility can lead to changes in permeation rate with time owing to structural changes of the membrane with time. The plastic should peferably dissolve, or take up, so little of the contaminant that the weight of the plastic increases by less than 0.1% under conditions of use or storage. It should, however, be pointed out that a certain solubility of the contaminant in the plastic is necessary for the permeation process. No pin-holes or pores should be present in the plastic through which the contaminant could simply pass from one side of the membrane to the other.

A wide range of permeation rates can be covered by this method by selecting a suitable plastic and by changing the geometry of the plastic. The maximum rate of permeation is given by the requirement that the supply of contaminant in the container should last for the desired period of time, which may be as long as a year under continuous use. It is therefore preferable to have a permeation rate of less than $10^{-4}$ grams of contaminant per minute. A permeation rate below this value will be referred to in this application as "low rate".

It is also understood that such controlled contaminant sources are preferably used for generating low concentrations of contaminant in the gas stream because of the limited supply of contaminant in the vessel. These concentrations will generally be below 100 parts of contaminant per one million part of principal gas by volume. Concentrations below this value will be referred to as "low concentration" in this application.

The container is filled with the contaminant gases under a pressure, which is preferably at most 10 atmospheres, e.g. atmospheric pressure or pressures of 2, 4 or 6 atmospheres.

It is also understood that vessel 2 can contain more than one species of contaminant. The amount of each contaminant species diffusing through the membrane and being added to the gas stream depends on its partial pressure inside the vessel. The term "contaminant" or "contaminant gas" as used in this application can therefore denote a single species of contaminant or a plurality of such species (e.g. a mixture of five volumes of carbon monoxide and two volumes of nitrogen monoxide).

The area of the membrane is only a small fraction, less than ¼ of the area of the impermeable walls of the vessel. Thus the vessel 2 (of FIG. 2) may be a 100 ml. glass vessel (whose main body is of generally cylindrical configuration about 6 centimeters in diameter) filled with CO at atmospheric pressure; and the plane membrane 14 may be circular, 2 centimeters in diameter, made of polytetrafluoroethylene 0.001 inch in thickness. In the embodiment shown in FIG. 1 the same vessel 2 filled with CO at atmospheric pressure, may be employed, and the tubing may be of polytetrafluoroethylene having a wall thickness of 0.5 mm., an internal diameter of 5 mm. and a length of 18 cm.

In order to increase the capacity of the vessel when holding permanent gases the vessel may be filled with a gas-absorbing compound which dissociates to form the desired gas. For instance a liquid or compound which has an equilibrium partial pressure of CO of up to 10 atmospheres may be used, e.g. an aqueous solution of cuprous chloride having CO absorbed therein. A suitable solution which absorbs thirty times its volume of carbon monoxide consists of 120 g. of cuprous chloride and 560 milliliters of 25% ammonia dissolved in one liter of water. Also, compounds such as metalcarbonyls can be used.

Permeation rates through plastic membranes are highly dependent on temperature. Accordingly, the devices should be operated in conjunction with a suitable thermostat to maintain a constant temperature (e.g. 25° C.), so that device delivers a constant amount of contaminant with high accuracy.

Figure 4:
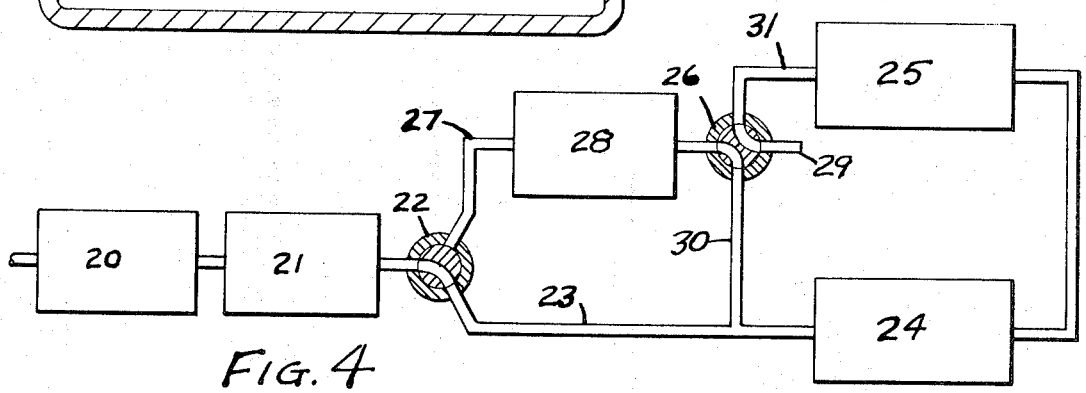
FIG. 4 is a schematic view of a flow system for delivering gas containing a certain concentration of contaminants and also gas free of such contaminants.

The standardization of a gas sensor often requires not only a gas containing a known amount of contaminant but also a gas free of such contaminant. An apparatus that will provide both such standardization gases as well as pump the gas to be analyzed through the sensor is known schematically in FIG. 4. Another important feature of this apparatus is the fact that a gas stream is continuously passed through the contaminant adding device, which may be of the type shown in FIGS. 1 or 2. This continuous flow of gas prevents any accumulation of the contaminant and assures immediate availability of a gas mixture of constant concentration. For this purpose, the incoming gas stream entering through a pump and a flowmeter can be switched by two valves and to take the following paths: (a) first through the sensor and then through the contaminant-adding device (controlled source of contaminant), when the incoming gas is being analyzed, (b) through a filter removing the contaminant from the incoming gas, then through the sensor and then through the controlled source of contaminant, when the zero point of the sensor is being established, (c) through said filter, then through the controlled source of contaminant and then through the sensor, when the sensor is being standardized at a known level of contaminant.

More specifically, for actual measurement the gas to be analyzed is introduced into the apparatus through pump 20 and flowmeter 21. It is led by means of three-way valve 22 into line 23 through sensor 24 and then through the controlled contaminant source 25 which can be of the type shown in FIGS. 1 or 2. As the sensor 24 one may employ an electrochemical apparatus as described in my copending application Ser. No. 718,032 filed Apr. 2, 1968. The gas then leaves the apparatus through four-way valve 26 and outlet 29.

For establishing the zero point of the sensor the flow system is changed by turning valve 22. Now the entering gas is conducted by valve 22 into line 27. It then passes through filter 28 which removes the contaminants from the gas stream. For example, the removal of sulfur dioxide is accomplished by passing the gas through a tube filled with "Ascarite", made by the A. H. Thomas Company of Philadelphia, Pa. Filters for other contaminants are well known and commercially available. The purified gas leaving filter 28 is then conducted by valve 26 into line 30. It then passes through the sensor 24 and through the controlled contaminant source before leaving the apparatus through line 31, valve 26, and outlet 29.

For calibrating the sensor with gas of known composition the entering gas is conducted by valve 22 into line 27 leading into filter 28. It is then conducted by valve 26 into line 31. It then passes through the controlled contaminant source 25 and through sensor 24 before leaving the apparatus through line 30, valve 26 and outlet 29.

While the device of this invention finds its greatest utility as a source of a contaminant which is a permanent gas, It may also be used for supplying contaminants of higher molecular weight (e.g. up to 200) such as $SO_2$ or contaminants which are organic compounds).

It is understood that the foregoing detailed description is merely given by way of illustration and that many variations may be made therein without departing from the spirit of the invention. The "Abstract" given above is merely for the convenience of searchers and is not to be given any weight in defining the scope of the invention.

What is claimed is:

1. A device for adding, to a principal gas stream, a predetermined low concentration of a contaminant permanent gas other than nitrogen or oxygen, said device comprising a vessel containing an encolsed volume of said contaminant gas under a partial pressure of one to ten atmospheres, said contaminant gas being in contact with the walls of said vessel, said walls being substantially impermeable to said contaminant gas, said vessel having a non-porous membrane permeable to said contaminant gas at a slow rate, said vessel having an inlet and an outlet for the passage of said principal gas stream, whereby said principl gas stream is in contact with one side of the membrane while said enclosed volume of said contaminant gas is in contact with the other side of the mebrane, and means for preventing flow of said principal gas stream over said membrane when said device is not in use, the ratio of the surface area of said membrane in contact with said contaminant gas to surface area of said walls in contact with said contaminant gas being less than 1:4.

2. A device as in claim 1 in which said contaminant gas is carbon monoxide or nitric oxide.

3. A device as in claim 1 in which said membrane is made of polyetetrafluoroethylene, fluorinated ethylene-propylene copolymer, polyethylene, or polypropylene.

4. A device as in claim 1 in which said membrane is in the form of a tube whose outside walls are in contact with said enclosed volume of contaminant gas and through which said principal gas stream is passed.

5. A device as in claim 1 in which said membrane is planar.

6. A controlled source unit for use in supplying, to a principal gas stream, a predetermined low concentration of a contaminant gas which is a permanent gas other than nitrogen or oxygen, said unit comprising a vessel containing an enclosed volume of said contaminant gas under a partial pressure of one to ten atmosphere, said contaminant gas being in contact with the walls of said vessel, said walls being substantially impermeable to said contaminant gas, said vessel having a nonporous membrane permeable to said contaminant gas, at slow rate, said vessel having a mouth and said membrane being situated to come in contact with said principal gas stream when the latter stream is introduced into said mouth, whereby said principal gas stream is in contact with one side of the membrane while said enclosed volume of said contaminant gas is in contact with the other side of the membrane, the ratio of the surface area of said membrane in contact with said contaminant gas to the surface area of said walls in contact with said contaminant gas being less than 1:4, and a removable closure for said mouth, said mouth being constructed and arranged to be attached to an inlet and outlet for said principal gas stream.

7. A device for adding, to a principal gas stream, a predetermined low concentration of a contaminant, said device comprising a vessel containing an enclosed volume of said contaminant, said contaminant being in contact with the walls of said vessel, the contents of said vessel consisting essentially of gas, said walls being substantially impermeable to said contaminant, said vessel having a non-porous membrane permeable to said contaminant, at a slow rate, said vessel having an inlet and an outlet for the passage of said principal gas stream over said membrane in said vessel, whereby said principal gas stream is in contact with one side of the membrane while said enclosed volume of said contaminant is in contact with the other side of the membrane and means for preventing flow of said principal gas stream over said membrane when said device is not in use, the ratio of the surface area of said membrane in contact with said contaminant to the surface area of said walls in contact with said contaminant being less than 1:4.

8. A system for analysis for atmospheric contaminants comprising a controlled source unit containing an enclosed volume of the contaminant to be measured and having a membrane permeable to said contaminant at a slow rate, a pump for supplying a stream of a gas sample of unknown composition which is to be analyzed for its content of said contaminant at a known constant volumetric rate, means for removing said contaminant from said stream of gas sample of unknown composition, sensing means for measuring the concentration of said contaminant, and duct and switch means constructed and arranged to selectively pass said stream from said pump through the following paths: (a) Through said sensing means and then through said controlled source unit; (b) Through said contaminant-removing means, then through said sensing means and then through said controlled source unit, whereby the zero point of said sensing means is established; and (c) Through said contaminant-removing means, then through said controlled source unit and then through said sensing means whereby said sensing means is calibrated at a known predetermined level of said contaminant, said source unit being continuously flushed by said stream of gas during the passage of said stream through each of said paths.

9. A system as in claim 8 in which said controlled source unit is as defined in claim 1.

10. A controlled source unit for use in supplying carbon monoxide, to a principal gas stream, at a predetermined low concentration comprising a vessel containing a compound which dissociates to CO, at a partial pressure of up to 10 atmospheres, at 25° C., in contact with a non-porous membrane permeable to carbon monoxide, whereby when said principal gas stream is passed over said membrane said stream takes up carbon monoxide at a controlled rate.

11. A device as in claim 1 in which said nonporous membrane is essentially the sole barrier between said contaminant permanent gas and said principal gas stream.

12. A device for adding, to a principal gas stream, a predetermined low concentration of a contaminant, said device comprising a vessel containing an enclosed volume of said contaminant, said contaminant being in contact with the walls of said vessel, said contaminant being a predetermined mixture of a plurality of compounds, said walls being substantially impermeable to said contaminant, said vessel having a non-porous membrane permeable to said contaminant, at a slow rate, said vessel having an inlet and an outlet for the passage of said principal gas stream over said membrane in said vessel, whereby said principal gas stream is in contact with one side of the membrane while said enclosed volume of said contaminant is in contact with the other side of the membrane and means for preventing flow of said principal gas stream over said membrane when said device is not in use, the ratio of the surface area of said membrane in contact with said contaminant to the surface area of said walls in contact with said contaminant being less than 1:4.

References Cited

UNITED STATES PATENTS

| | | | |
|---|---|---|---|
| 2,536,610 | 1/1951 | King et al. | |
| 3,122,913 | 3/1964 | Gargasson | 73—23 |
| 3,188,854 | 6/1965 | Hirsch | 73—23 |
| 3,209,579 | 10/1965 | Roberts. | |

S. CLEMENT SWISHER, Primary Examiner